(12) United States Patent
Kannan et al.

(10) Patent No.: US 11,778,270 B2
(45) Date of Patent: *Oct. 3, 2023

(54) AUTOMATICALLY LOADING USER PROFILE TO SHOW RECENTLY WATCHED CHANNELS

(71) Applicant: Nagravision S.A., Cheseaux-sur-Lausanne (CH)

(72) Inventors: Srinivasan Kannan, Bangalore (IN); Siddalinga Swamy, Bangalore (IN); Amudha Kaliamoorthi, Bangalore (IN)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 59 days.

This patent is subject to a terminal disclaimer.

(21) Appl. No.: 17/447,023

(22) Filed: Sep. 7, 2021

(65) Prior Publication Data

US 2021/0400344 A1 Dec. 23, 2021

Related U.S. Application Data

(63) Continuation of application No. 16/279,295, filed on Feb. 19, 2019, now Pat. No. 11,146,855, which is a
(Continued)

(51) Int. Cl.
*H04N 21/45* (2011.01)
*H04N 21/41* (2011.01)
(Continued)

(52) U.S. Cl.
CPC ........ *H04N 21/4532* (2013.01); *H04N 21/25* (2013.01); *H04N 21/251* (2013.01);
(Continued)

(58) Field of Classification Search
None
See application file for complete search history.

(56) References Cited

U.S. PATENT DOCUMENTS 9,729,925 B2    8/2017  Kannan et al.
10,057,640 B2 *  8/2018  Oshima ............ H04N 21/25891
(Continued)

FOREIGN PATENT DOCUMENTS

EP    3136735 B1   11/2020

OTHER PUBLICATIONS

U.S. Appl. No. 14/841,552 U.S. Pat. No. 9,729,925, filed Aug. 31, 2015, Automatically Loading User Profile to Show Recently Watched Channels.
(Continued)

*Primary Examiner* — Alexander Q Huerta
(74) *Attorney, Agent, or Firm* — SCHWEGMAN LUNDBERG & WOESSNER, P.A.

(57) ABSTRACT

Aspects of the present disclose involve a method, a device, and a system comprising a processor and a machine-readable storage medium storing at a set of instructions for identification and authentication of user profiles associated with a digital television system and displaying information related thereto. In example embodiments, the method includes identifying a user profile registered with a content presentation device based on received identification data that includes biometric data. The method further includes receiving, from a server, identifiers of a set of recently watched channels associated with the user profile and causing presentation of a recent channels interface that includes selectable elements corresponding to the set of recently watched channels.

20 Claims, 11 Drawing Sheets

Related U.S. Application Data continuation of application No. 15/661,555, filed on Jul. 27, 2017, now abandoned, which is a continuation of application No. 14/841,552, filed on Aug. 31, 2015, now Pat. No. 9,729,925.

(51) Int. Cl.

| | |
|---|---|
| *H04N 21/422* | (2011.01) |
| *H04N 21/25* | (2011.01) |
| *H04N 21/258* | (2011.01) |
| *H04N 21/442* | (2011.01) |
| *H04N 21/466* | (2011.01) |
| *H04N 21/441* | (2011.01) |
| *H04N 21/4223* | (2011.01) |
| *H04N 21/4415* | (2011.01) |
| *H04N 21/658* | (2011.01) |
| *H04N 21/433* | (2011.01) |
| *H04N 21/458* | (2011.01) |
| *H04N 21/482* | (2011.01) |

(52) U.S. Cl.
CPC ......... *H04N 21/252* (2013.01); *H04N 21/258* (2013.01); *H04N 21/25875* (2013.01); *H04N 21/25891* (2013.01); *H04N 21/41* (2013.01); *H04N 21/422* (2013.01); *H04N 21/4223* (2013.01); *H04N 21/42201* (2013.01); *H04N 21/42203* (2013.01); *H04N 21/4332* (2013.01); *H04N 21/441* (2013.01); *H04N 21/442* (2013.01); *H04N 21/4415* (2013.01); *H04N 21/44204* (2013.01); *H04N 21/44218* (2013.01); *H04N 21/44222* (2013.01); *H04N 21/4586* (2013.01); *H04N 21/466* (2013.01); *H04N 21/4662* (2013.01); *H04N 21/4667* (2013.01); *H04N 21/4668* (2013.01); *H04N 21/482* (2013.01); *H04N 21/6582* (2013.01)

(56) References Cited

U.S. PATENT DOCUMENTS

| | | | | |
|---|---|---|---|---|
| 10,375,432 | B1* | 8/2019 | Matthews | H04N 21/4532 |
| 11,146,855 | B2 | 10/2021 | Kannan et al. | |
| 2002/0188948 | A1 | 12/2002 | Florence | |
| 2003/0115589 | A1 | 6/2003 | D'souza et al. | |
| 2007/0192791 | A1 | 8/2007 | Sullivan et al. | |
| 2008/0320519 | A1 | 12/2008 | Beadle et al. | |
| 2009/0138805 | A1* | 5/2009 | Hildreth | H04N 21/4751 |
| | | | | 715/745 |
| 2010/0262986 | A1* | 10/2010 | Adimatyam | H04N 21/4667 |
| | | | | 725/40 |
| 2011/0113441 | A1 | 5/2011 | Jeong et al. | |
| 2012/0021024 | A1 | 1/2012 | Boghani et al. | |
| 2012/0072944 | A1* | 3/2012 | Felt | H04N 21/47214 |
| | | | | 725/25 |
| 2012/0210226 | A1* | 8/2012 | McCoy | H04N 21/8455 |
| | | | | 715/719 |
| 2012/0210241 | A1 | 8/2012 | Wong et al. | |
| 2013/0133022 | A1* | 5/2013 | Bi | H04L 65/1069 |
| | | | | 725/152 |
| 2013/0167168 | A1* | 6/2013 | Ellis | H04N 21/458 |
| | | | | 725/12 |
| 2014/0282739 | A1 | 9/2014 | Augustine et al. | |
| 2014/0359647 | A1 | 12/2014 | Shoemake et al. | |
| 2015/0331551 | A1 | 11/2015 | Lee et al. | |
| 2016/0029291 | A1 | 1/2016 | Khalil et al. | |
| 2016/0246568 | A1* | 8/2016 | Vega | G11B 27/34 |
| 2017/0064390 | A1* | 3/2017 | Kannan | H04N 21/4668 |
| 2017/0332143 | A1 | 11/2017 | Kannan et al. | |
| 2019/0356953 | A1 | 11/2019 | Kannan et al. | |

OTHER PUBLICATIONS

U.S. Appl. No. 15/661,555, filed Jul. 27, 2017, Automatically Loading User Profile to Show Recently Watched Channels.
U.S. Appl. No. 16/279,295, filed Feb. 19, 2019, Automatically Loading User Profile to Show Recently Watched Channels.
"U.S. Appl. No. 14/841,552, Examiner Interview Summary dated Feb. 19, 2016", 3 pgs.
"U.S. Appl. No. 14/841,552, Final Office Action dated Sep. 1, 2016", 11 pgs.
"U.S. Appl. No. 14/841,552, Non Final Office Action dated Apr. 18, 2016", 10 pgs.
"U.S. Appl. No. 14/841,552, Non Final Office Action dated Dec. 12, 2016", 12 pgs.
"U.S. Appl. No. 14/841,552, Notice of Allowance dated Mar. 30, 2017", 8 pgs.
"U.S. Appl. No. 14/841,552, Response filed Aug. 10, 2016 to Non Final Office Action dated Apr. 18, 2016", 10 pgs.
"U.S. Appl. No. 14/841,552, Response filed Dec. 1, 2016 to Final Office Action dated Sep. 1, 2016", 12 pgs.
"U.S. Appl. No. 14/841,562, Response filed Mar. 13, 2017 to Non Final Office Action dated Dec. 12, 2016", 12 pgs.
"U.S. Appl. No. 15/661,555, Final Office Action dated Jul. 12, 2018", 11 pgs.
"U.S. Appl. No. 15/661,555, Non Final Office Action dated Mar. 9, 2018", 12 pgs.
"U.S. Appl. No. 15/661,555, Non Final Office Action dated Nov. 16, 2018", 11 pgs.
"U.S. Appl. No. 15/661,555, Preliminary Amendment filed Aug. 2, 2017", 8 pgs.
"U.S. Appl. No. 15/661,555, Response filed Jun. 11, 2018 to Non Final Office Action dated Mar. 9, 2018", 11 pgs.
"U.S. Appl. No. 15/661,555, Response filed Oct. 3, 2018 to Final Office Action dated Jul. 12, 2018", 12 pgs.
"U.S. Appl. No. 16/279,295, Non Final Office Action dated Dec. 10, 2020", 10 pgs.
"U.S. Appl. No. 16/279,295, Notice of Allowance dated Jun. 9, 2021", 7 pgs.
"U.S. Appl. No. 16/279,295, Preliminary Amendment Filed Aug. 8, 2019", 8 pgs.
"U.S. Appl. No. 16/279,295, Response Filed Mar. 8, 2021 to Non Final Office Action dated Dec. 10, 2020", 12 pgs.
"Brazilian Application Serial No. BR1020160200598, Office Action dated Aug. 26, 2020", with English translation, 7 pages.
"Brazilian Application Serial No. BR1020160200598, Response filed Nov. 27, 2020 to Office Action dated Aug. 26, 2020", with English claims, 61 pages.
"European Application Serial No. 16184613.4, Communication Pursuant to Article 94(3) EPC dated Aug. 2, 2018", 5 pgs.
"European Application Serial No. 16184613.4, Extended European Search Report dated Dec. 13, 2016", 8 pgs.
"European Application Serial No. 16184613.4, Response filed Feb. 12, 2019 to Communication Pursuant to Article 94(3) EPC dated Aug. 2, 2018", 27 pgs.
"European Application Serial No. 16184613.4, Response filed Apr. 9, 2020 to Summons to Attend Oral Proceedings dated Oct. 18, 2019", 15 pgs.
"European Application Serial No. 16184613.4, Response filed Sep. 1, 2017 to Extended European Search Report dated Dec. 13, 2016", 23 pgs.
"European Application Serial No. 16184613.4, Summons to Attend Oral Proceedings dated Oct. 18, 2019", 9 pgs.
"European Application Serial No. 20195827.9, Extended European Search Report dated Oct. 12, 2020", 9 pgs.
"European Application Serial No. 20195827.9, Communication Pursuant to Article 94(3) EPC dated Nov. 9, 2022", 5 pgs.
"European Application Serial No. 20195827.9, Response filed Feb. 14, 2023 to Communication Pursuant to Article 94(3) EPC dated Nov. 9, 2022", 12 pgs.

* cited by examiner

AUTOMATICALLY LOADING USER PROFILE TO SHOW RECENTLY WATCHED CHANNELS

CROSS-REFERENCE TO RELATED APPLICATIONS

This application is a continuation of U.S. patent application Ser. No. 16/279,295, filed on Feb. 19, 2019, which is a continuation of U.S. patent application Ser. No. 15/661,555, filed on Jul. 27, 2017, which is a continuation of U.S. patent application Ser. No. 14/841,552, filed on Aug. 31, 2015, and issued as U.S. Pat. No. 9,729,925 on Aug. 8, 2017, which applications are incorporated herein by reference in their entireties.

TECHNICAL FIELD

The subject matter disclosed herein generally relates to digital television systems. In particular, example embodiments relate to identification and authentication of user profiles associated with a digital television system and display of information related thereto.

BACKGROUND

Digital television systems are available that provide programming, advertisements, or other commercial messages to users. Typically, digital television communication involves the use of a set-top box (STB), which receives broadcast content and connects to a television set. Users generally control the selection of programming or other content through the STB. The STB runs software referred to as middleware, consisting of computer programs which control the flow of broadcast programs and internet traffic as well as data from users.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure involve identification and authentication of user profiles associated with a digital television system and displaying information related thereto. Example embodiments involve identifying and authenticating user profiles using identification data obtained by a content viewing device (e.g., a STB, a laptop, a tablet computer, or a smart phone). The identification data may, for example, include biometric data such as an image of the user (e.g., for purposes of facial or iris recognition) or a fingerprint of a user, or the identification data may include a username and password combination. The identification data obtained by the content viewing device is compared to stored authentication data of the same form (e.g., fingerprint or image) to authenticate the identity of the user before beginning a content viewing session using the content viewing device. Based on the comparison, a corresponding user profile is identified and the content viewing device loads the identified user profile to begin a content viewing session.

Once the user profile is loaded by the content viewing device, recent service data is fetched from a server. The recent service data includes a set of identifiers (e.g., channel number, service name, or service identifier) corresponding to recently watched channels associated with the user profile. For purposes of this disclosure, the term "channel" is intended to include both physical and virtual channels over which curated content (e.g., audio, video, or combinations thereof) is communicated (e.g., broadcast or streamed) to a content viewing device (e.g., a STB, a laptop, a tablet computer, or a smart phone) via any network and is intended to include communications via the Internet. The recently watched channels include channels accessed during a previous viewing session of the user profile on the content viewing device or a different content viewing device associated with the user profile. The content viewing device displays the recently watched channels in a specialized interface displayed in conjunction with live or recorded programming. By having recent service data associated with user profiles (as opposed to devices) in this manner, multiple users may utilize the recently watched channels interface feature on a single device.

Figure 1:
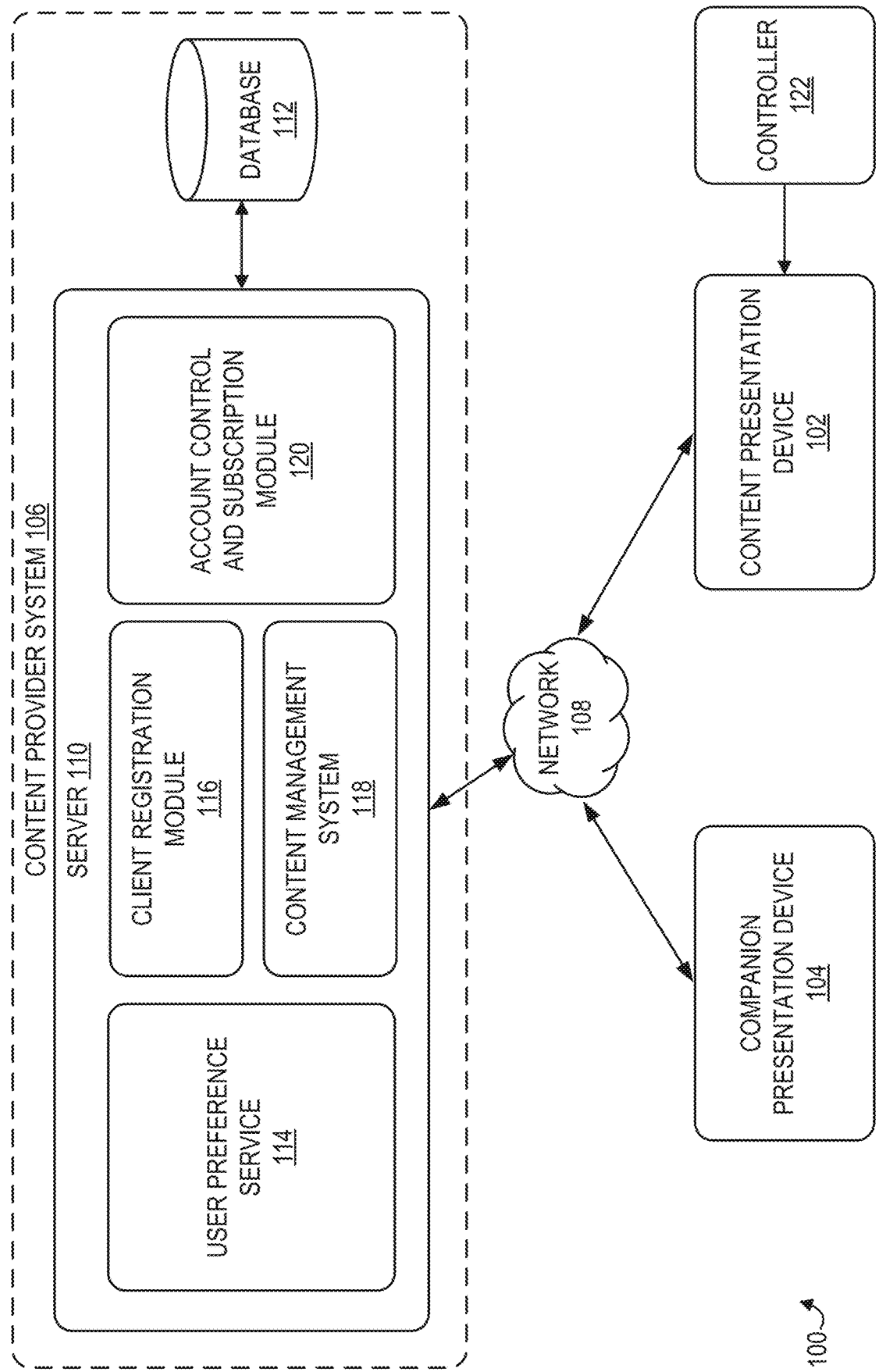
FIG. 1 is a network diagram illustrating a networked system configured to provide programming to one or more content viewing devices, according to some example embodiments.

FIG. 1 is a network diagram illustrating a network system 100 configured to provide programming to one or more content viewing devices, according to some example embodiments. To avoid obscuring the inventive subject matter with unnecessary detail, various functional components that are not germane to conveying an understanding of the inventive subject matter have been omitted from FIG. 1. However, a skilled artisan will readily recognize that various additional components may be included in the network system 100 to facilitate additional functionality that is not specifically described herein. Furthermore, it shall be appreciated that while the components of FIG. 1 are discussed in the singular sense, in other embodiments, multiple instances of one or more of the components may be employed.

As shown, the network system 100 includes a content presentation device 102 and companion presentation device 104 in communication with a content provider system 106 over a network 108. The content provider system 106 maintains a plurality of accounts for subscribers of the services provided thereby. The services provided by the content provider system 106 include providing access to curated, on-demand, and/or recorded content. Such content may be broadcast, streamed, or otherwise provided by one or more content channels (also referred to herein simply as "channels"). Thus, in some embodiments, the content provider system 106 provides registered account holders and associated users with access to content channels. Multiple devices may be registered to each account, and multiple user profiles may be registered to each registered device. The content presentation device 102 and the companion presentation device 104 are examples of devices that may be registered with an account maintained by the content provider system 106, and used to access content made available or provided by the content provider system 106. The content presentation device 102 and the companion presentation device 104 may be any one of a variety of devices that include a processor and communication capabilities that provide access to the network 108 and that are coupled to or include an embedded display. Accordingly, the content presentation device 102 and the companion presentation device 104 may, for example, be a STB coupled to a television, a desktop computer coupled to a monitor, a laptop, a tablet computer, a smart phone or the like.

In some instances, the content presentation device 102 is used as primary viewing device such as an STB communicatively coupled to a television or other display that is used to access content while the companion presentation device 104 is a used as a secondary viewing device or complementary viewing device such as a tablet computer. However, it shall be appreciated that the content presentation device 102 and the companion presentation device 104 are not intended to be limited to such configurations and, in some embodiments, the companion presentation device 104 may be another instance of the content presentation device 102 that is used to view and access content provided or made available by the content provider system 106.

A controller 122 is used to control certain functionality of the content presentation device 102. For example, a user may user the controller 122 to tune the content presentation device 102 to a particular channel. Accordingly, the controller 122 includes one or more buttons or other input mechanisms (e.g., a touch screen, microphone, etc.) to allow users to input commands to control the content presentation device 102. In some embodiments, the controller 122 is embedded in the content presentation device 102. In some embodiments, the controller 122 is separate from the content presentation device 102 though still able to remotely transmit commands to the content presentation device 102. For example, the controller 122 may be an infrared (IR) remote controller capable of transmitting command signals to an IR receiver (not shown) embedded in the content presentation device 102.

The content provider system 106 communicates and exchanges data (e.g., content) with the content presentation device 102 and companion presentation device 104 that pertains to various functions and aspects associated with the network system 100 and its users. Likewise, the content presentation device 102 and the companion presentation device 104 may be operated by a user (e.g., a person) of the network system 100 to exchange data with the content provider system 106 over the network 108.

The content presentation device 102 and the companion presentation device 104 communicate with the network 108 via a wired or wireless connection. For example, one or more portions of the network 108 may comprise an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a Wireless Fidelity (Wi-Fi®) network, a Worldwide Interoperability for Microwave Access (WiMax) network, a cable network, a terrestrial network, or any suitable combination thereof Turning specifically to the content provider system 106, a server 110 is coupled to the network 108 (e.g., via wired or wireless interfaces) and a database 112. The server 110 hosts a user preference service 114, a client registration module 116, a content management system 118, and an account control and subscription module 120. It shall be appreciated that, although the user preference service 114, the client registration module 116, the content management system 118, and the account control and subscription module 120 are all illustrated as being hosted by a single server, these components may be deployed on various other hardware configurations and are not intended to be limited to the server 110. For example, each of the user preference service 114, the client registration module 116, the content management system 118, and the account control and subscription module 120 may reside on a single server 110 or may be distributed across several sever computers in various arrangements.

The user preference service 114 is responsible for receiving, processing, and storing user information. For example, the user preference service 114 receives user information from the content presentation device 102, and uses the user information to validate the identity of the user for use in tracking user activity during a content viewing session, which the user preference service 114 uses to infer user preferences. The user preference service 114 stores user preferences in the database 112. In some instances, the user preferences are based on services utilized by a user during a content viewing session, and thus, the stored user preferences may include recent service data. As an example, the user preference service 114 tracks the channels watched by a user during a content viewing session, which are logged as recently watch channels. The user preference service 114 may then work in conjunction with the content presentation device 102 to provide the user with an interface to view and select from a list of recently watched channels.

The client registration module 116 is configured to register new content viewing devices with an account, and to register user profiles with registered content viewing devices. The client registration module 116 receiver user profile data from the content presentation device 102 and stores the user profile data in a user profile record in the database 112. The user profile record is linked to the content presentation device 102, which is linked to the account.

The content management system 118 provides the content presentation device 102 and companion presentation device 104 with information (e.g., metadata) about content. The information can include titles, descriptions, dates, images, or other attribution information related to the staff involved in production of content, and other such information about the content.

The account control and subscription module 120 may be used by users (e.g., through interaction with the content presentation device 102) to configure and adjust aspects of their accounts. For example, the account control module 120 may be used to add or remove program offerings (e.g., packaged channels) from an account. The account control module 120 may further be used to control content access permissions associated with user profiles linked to the account.

The database 112 stores data pertaining to various functions and aspects associated with the network system 100 and its users. For example, the database 112 stores a plurality of account records corresponding to accounts maintained by the content provider system 106. Each account record includes information about the account, including an account identifier (e.g., account number) and information related to the services subscribed to by the account. Each account record may be linked to one or more device records which may in turn be linked to one or more user profile records. The database 112 further stores recent service data associated with each user profile record. The recent service data includes information related to recent services utilized by the user profile such as a list of recently watched channels for the user profile.

Figure 2:
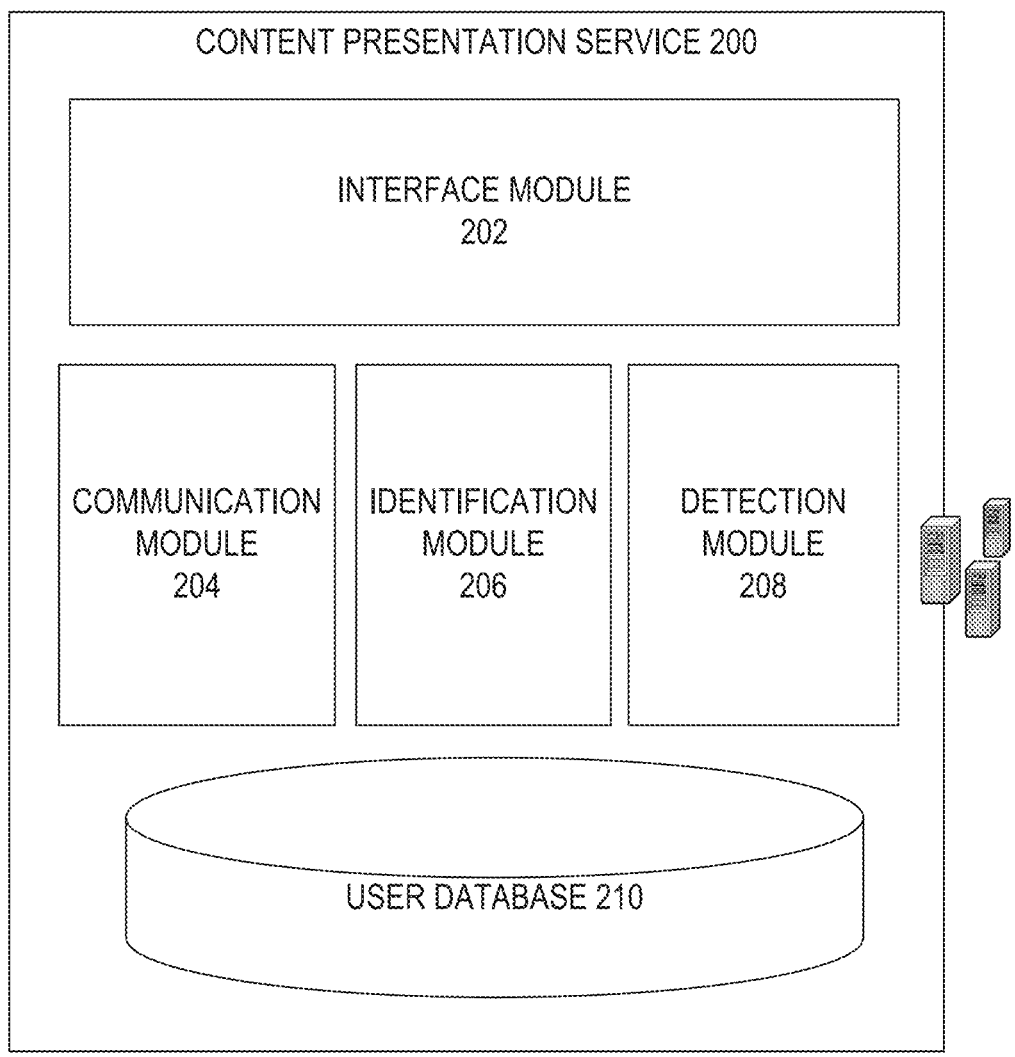
FIG. 2 is a block diagram illustrating various functional components of a content presentation service executable by one or more content viewing devices to facilitate a content viewing session, according to some example embodiments.

FIG. 2 is a block diagram illustrating various functional components of a content presentation service 200 executable by one or more content viewing devices to facilitate a content viewing session, according to some example embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the content presentation service 200 to facilitate additional functionality that is not specifically described herein.

The various functional components depicted in FIG. 1 may reside on the content presentation device 102, the companion presentation device 104, or both. As is understood by skilled artisans in the relevant computer arts, the modules illustrated in FIG. 1 represent a set of executable software instructions and the corresponding hardware (e.g., memory and processor) for executing the instructions. Moreover, it shall be appreciated that, while the functional components (e.g., modules) of FIG. 2 are discussed in the singular sense, in other embodiments, multiple instances of one or more of the modules may be employed.

As illustrated in FIG. 2, the content presentation service 200 includes an interface module 202, a communication module 204, an identification module 206, and a detection module 208, all configured to be in communication with each other (e.g., via a bus, a shared memory, a network, or a switch) so as to allow information to be passed between the functional components or so as to allow the functional components to share and access common data. Additionally, each of the functional components illustrated in FIG. 1 may access and retrieve data from a user database 210.

As shown, the content presentation service 200 is generally based on a three-layer software architecture, consisting of a front-end layer, an application layer, and a data layer, although the inventive subject matter is by no means limited to such architecture. The presentation layer consists of the interface module 202. The interface module 202 is responsible for presenting information and handling user interactions related to the functions of the content presentation service 200. Accordingly, the interface module 202 may provide a number of interfaces to users (e.g., interfaces that are presented on a television or other display coupled to or embedded in the content presentation device 102). The interfaces provided by the interface module 202 may include one or more graphical elements (e.g., buttons, toggles, switches, drop-down menus, or sliders) that may be manipulated through user input to perform various operations associated with a content viewing session. For example, the interface module 202 provides a recent channels interface that allows users to view recently watched channels and tune the content presentation device 102 to one of those channels. Further details of the recent channels interface, according to some example embodiments, are discussed below in reference to FIG. 10 and FIG. 11.

The application layer of the content presentation service 200 includes the communication module 204, the identification module 206, and the detection module 208. The communication module 204 is responsible for handling communication with the server 110. Accordingly, the communication module 204 may exchange (e.g., transmit and receive) data with the server 110 to facilitate content viewing sessions and other enhanced services related thereto. For example, the communication module 204 transmits log in requests to the server 110 to initiate content viewing sessions associated with a particular user profile. The communication module 204 also retrieves (e.g., through appropriate API calls) recent service data from the server 110 associated with particular user profiles. In some embodiments, the communication module 204 may transmit identification data to the server 110 for processing (e.g., to identify and authenticate a user profile), and in turn, receive user profile information from the server 110.

The identification module 206 is responsible for identifying and loading user profiles, which are used to provide personalized content presentation services. The identification module 206 identifies user profiles using received identification data. More specifically, the identification module 206 identifies user profiles by comparing the received identification data to stored authentication data associated with user profiles registered with the content presentation device 102. In comparing received identification data to stored authentication data the identification module 206 attempts to match the received identification data with authentication data associated with a particular user profile. In response to identifying a matching user profile, the identification module 206 loads the user profile and causes the user profile to be logged in to the server 110 to initiate a content viewing session for the user profile.

The identification module 206 may further work in conjunction with the communication module 204 to obtain recent service data associated with the loaded user profile from the server 110 using an identifier of the user profile. The recent service data includes identifiers of a set of channels accessed during a previous viewing session of the user profile (also referred to herein as "recently watched channels").

In some embodiments, the identification data may include biometric data such as, for example, an image of a user or a fingerprint of the user. Depending on the form of the identification data, the identification module 206 may obtain the identification data from an input device such as an image capture device (e.g., a camera), microphone, retinal scanner, or fingerprint reader communicatively coupled to or included in the content presentation device 102 or the companion presentation device 104. The stored authentication data, which is obtained from a similar source as the identification data (e.g., an image capture device or a fingerprint reader), is created upon registering the user profile with the content viewing device.

The detection module 208 is responsible for identifying recently watched channels associated with user profiles. To this end, the detection module 208 is configured to identify channels viewed during a content viewing session. Instead of logging each channel to which the content presentation device 102 is tuned during a content viewing session, the detection module 208 logs channels to which the content presentation device 102 is tuned for a predetermined time period (e.g., 5 minutes) to ensure that these channels are channels actually watched by the user, and therefore, of possible interested to the user, as opposed to channels the user briefly tuned into before tuning in to another channel (e.g., by a process known as "channel surfing"). After the detection module 208 determines a channel has been watched (e.g., by virtue of the content presentation device 102 being tuned to the channel for a predefined period of time), the detection module 208 works in conjunction with the communication module 204 to transmit an identifier of the channel (e.g., a channel number) to the server 110 for inclusion in the list of most recent channels included in the recent service data associated with the user profile.

The data layer of the content presentation service 200 includes the user database 210. The user database 210 is a machine-readable storage unit that stores a plurality of user profile records corresponding to user profiles registered with the content presentation device 102. The user profile records include a user profile identifier and user profile data that includes user personal data obtained during user profile registration.

Figure 3:
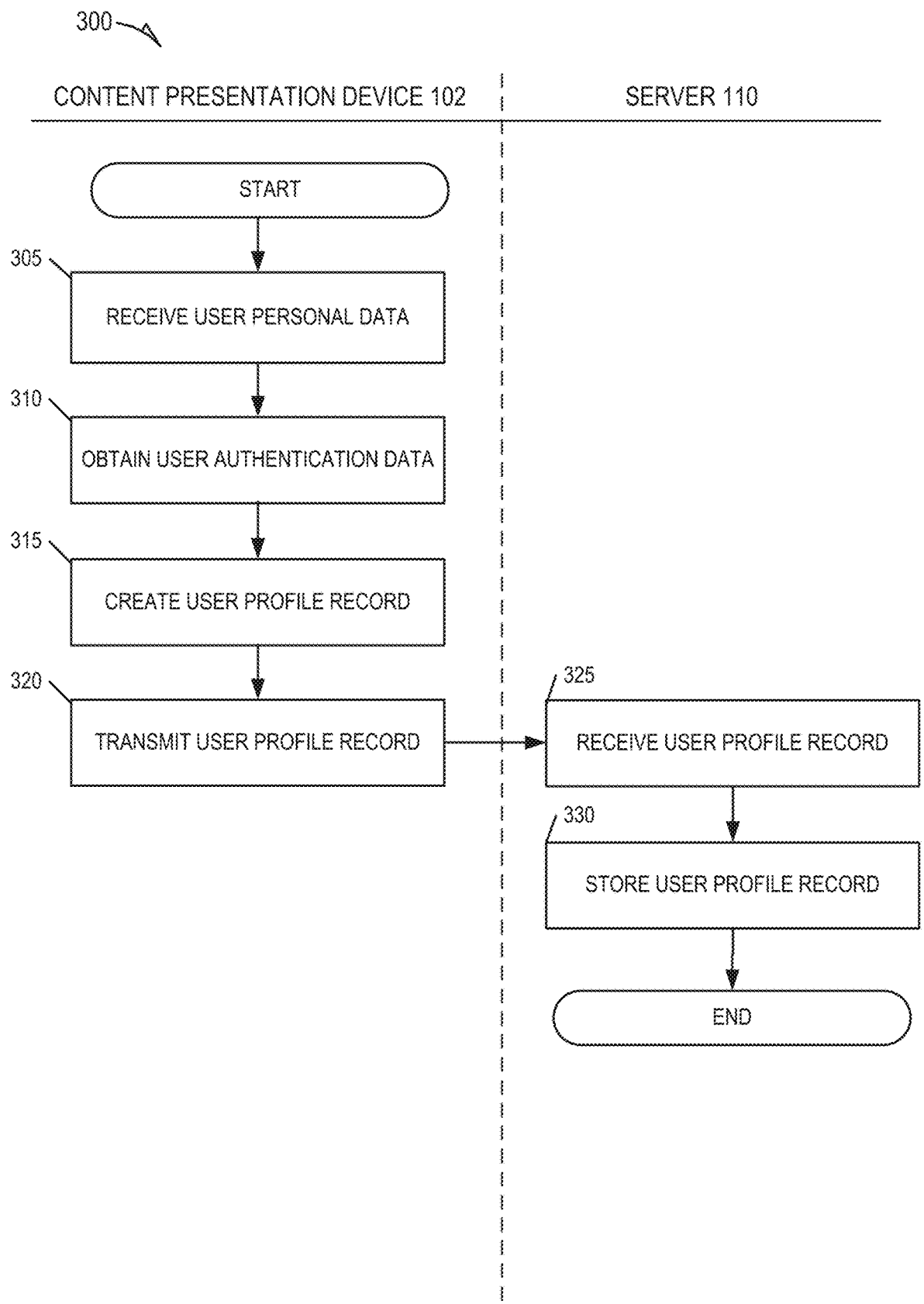
FIG. 3 is a swim lane flow chart illustrating a method for registering a user profile with a content viewing device, according to some example embodiments.

FIG. 3 is a swim lane flow chart illustrating a method 300 for registering a user profile with the content viewing device, according to some example embodiments. The method 300 may be embodied in machine-readable instructions for execution by a hardware component (e.g., a processor) such that the operations of the method 300 may be performed by the content presentation device 102 and the server 110; accordingly, the method 300 is described below, by way of example with reference thereto. However, it shall be appreciated that the method 300 may be deployed on various other hardware configurations and is not intended to be limited to the content presentation device 102 and the server 110. For example, although FIG. 2 illustrates a number of operations being performed by the content presentation device 102, it shall be appreciated that, in other embodiments, these operations may be performed by the companion presentation device 104.

At operation 305, the content presentation device 102 receives user personal data corresponding to an unregistered user. The user personal data may be received via user input entered, via a controller 122, into a user interface displayed by the content presentation device 102. The user personal data may include a user name, a profile name, an account identifier, and demographic information about the user (e.g., gender, birthdate, location, etc.).

At operation 310, the content presentation device 102 obtains user authentication data for use in authenticating the identity of the user in subsequent sessions. The authentication data may include a fingerprint, an image of the user, or both. Accordingly, in some embodiments, the obtaining of the authentication data may include receiving raw fingerprint data from a fingerprint reading communicatively coupled to or embedded in the content presentation device 102. Further, in some embodiments, the obtaining of the authentication data may include receiving image data from an image capture device (e.g., a camera) communicatively coupled to or embedded in the content presentation device 102. In some embodiments, the obtaining of the authentication data may include receiving audio data from a microphone communicatively coupled to or embedded in the content presentation device 102.

At operation 315, the content presentation device 102 creates a user profile record in the user database 210. The user profile record comprises a user profile identifier and user profile data. The user profile data comprises the user personal data and the user authentication data (e.g., fingerprint data, image data, audio data, etc.). The user profile record may be stored with multiple other user profile records in the user database 210.

Figure 4:
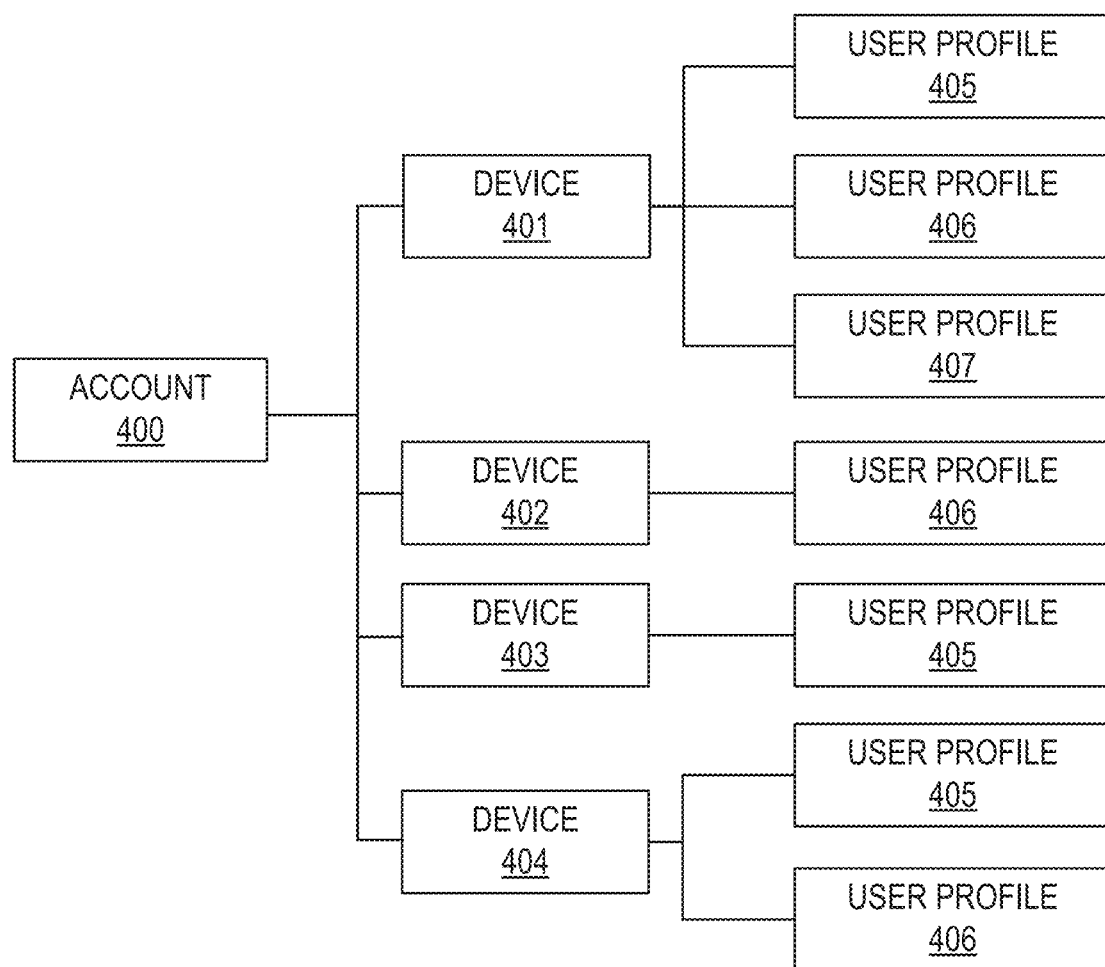
FIG. 4 is a high-level entity-relationship diagram, illustrating various records that may be maintained within a database of the networked system, according to some example embodiments.

At operation 320, the content presentation device 102 transmits the user profile record to the server 110, and at operation 325, the user profile record is received by the server 110. At operation 330, the server 110 stores the user profile record with a linkage to an account record and a corresponding registered content presentation device 102. For example, FIG. 4 is a high-level entity-relationship diagram, illustrating various records that may be maintained within the database 112, according to some example embodiments.

An account record 400 contains a record of an account with the content provider system 106 that, for example, provides the programming to the content presentation device 102, the companion presentation device 104, and other such devices. The account record 400 includes an account identifier along with service data that includes information related to the services (e.g., programming) available to (e.g., by virtue of a subscription thereto) users associated with the account.

As shown, the account record 400 is linked to device records 401-404 so as to maintain an association of multiple content viewing devices registered with an account. Each of device records 401-404 corresponds to a content viewing device (e.g., content presentation device 102 or companion presentation device 104) registered with the account corresponding to the account record 400. Accordingly, each device record 401-404 includes an identifier of the device along with other information about the device.

As shown, each device record 401-404 is linked to one or more user profile records so as to maintain an association between devices and user profiles. For example, device record 401 is linked to user profile records 405-407, device record 402 is linked to user profile record 406, device record 403 is linked to user profile record 405, and device record 404 is linked to user profile records 405 and 406. Thus, because users may utilize multiple different content viewing devices, user profile records may be linked to multiple device records. Further, because each of the device records 401-404 are linked to the account record 400, the linkage of the device records 401-404 to the user profile records 405-407 also serves to maintain a linkage between the user profile records 405-407 and the account record 400. Each user profile record 405-407 may further include or be linked to recent service data that includes services recently utilized during a viewing session of the user profile (e.g., recently watched channels).

Figure 5:
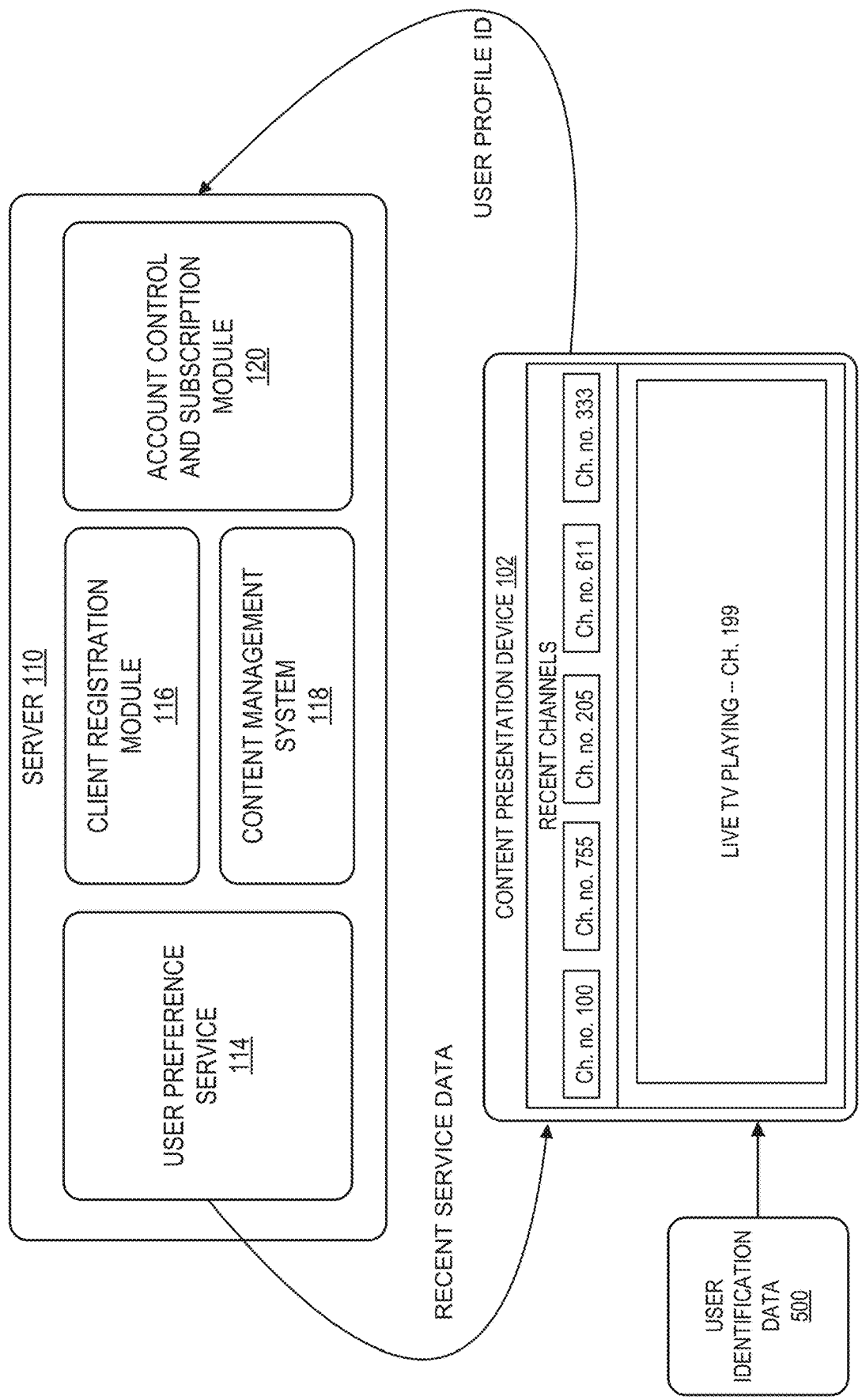
FIG. 5 is a data flow diagram illustrating a flow of data involved in displaying a recent channel interface associated with a particular user profile, according to some example embodiments.

FIG. 5 is a data flow diagram illustrating a flow of data involved in displaying a recent channel interface associated with a particular user profile, according to some example embodiments. As shown, the flow of data begins with the content presentation device 102 receiving user identification data 500 as input. The identification data 500 may, for example, include login credentials (e.g., user name and/or password), fingerprint data, audio data, or image data depending on the form of authentication data used in establishing the user profile. In instances in which the authentication data includes fingerprint data, the identification data 500 is received via a fingerprint reader communicatively coupled to or embedded in the content presentation device 102. In instances in which the authentication data includes image data, the user identification data 500 is received via an image capture device communicatively coupled to or embedded in the content presentation device 102. In instances in which the authentication data includes audio data, the identification data 500 is received via a microphone communicatively coupled to or embedded in the content presentation device 102.

Once the identification data 500 is obtained by the content presentation device 102, the content presentation device 102 processes the identification data 500 to identify a corresponding user profile. More specifically, the content presentation device 102 compares the identification data 500 with authentication data stored in one or more user profile records stored in the user database 210 to identify a match. For example, in instances in which the authentication data and identification data 500 include fingerprint data, the content presentation device 102 compares received fingerprint data with stored fingerprint data associated with one or more user profile records to identify a matching user profile. As another example, in instances in which the authentication data and the identification data 500 includes an image, the content presentation device 102 compares a received image with stored images associated with one or more user profile records to identify a matching user profile. Once the content presentation device 102 identifies matching authentication data, the content presentation device 102 loads the corresponding user profile.

Once the corresponding user profile is identified, the content presentation device 102 transmits an identifier of the user profile to the server 110 to obtain access the content provided by the content provider system 106. It shall be appreciated that, in some embodiments, the identification data 500 is transmitted directly from the content presentation device 102 to the server 110 for authentication processing at the server 110. In these embodiments, once the server 110 identifies the user profile, the server 110 transmits the user profile data to the content presentation device 102 so that the content presentation device 102 may load the user profile.

Once the user profile is loaded on the content presentation device 102, the content presentation device 102 retrieves recent service data from the server 110. The recent service data includes identifiers of recently watched channels of the user profile. The identifiers of the recently watched channels are then displayed in a recently watched channels interface displayed in conjunction with other live or recorded programming.

Figure 6:
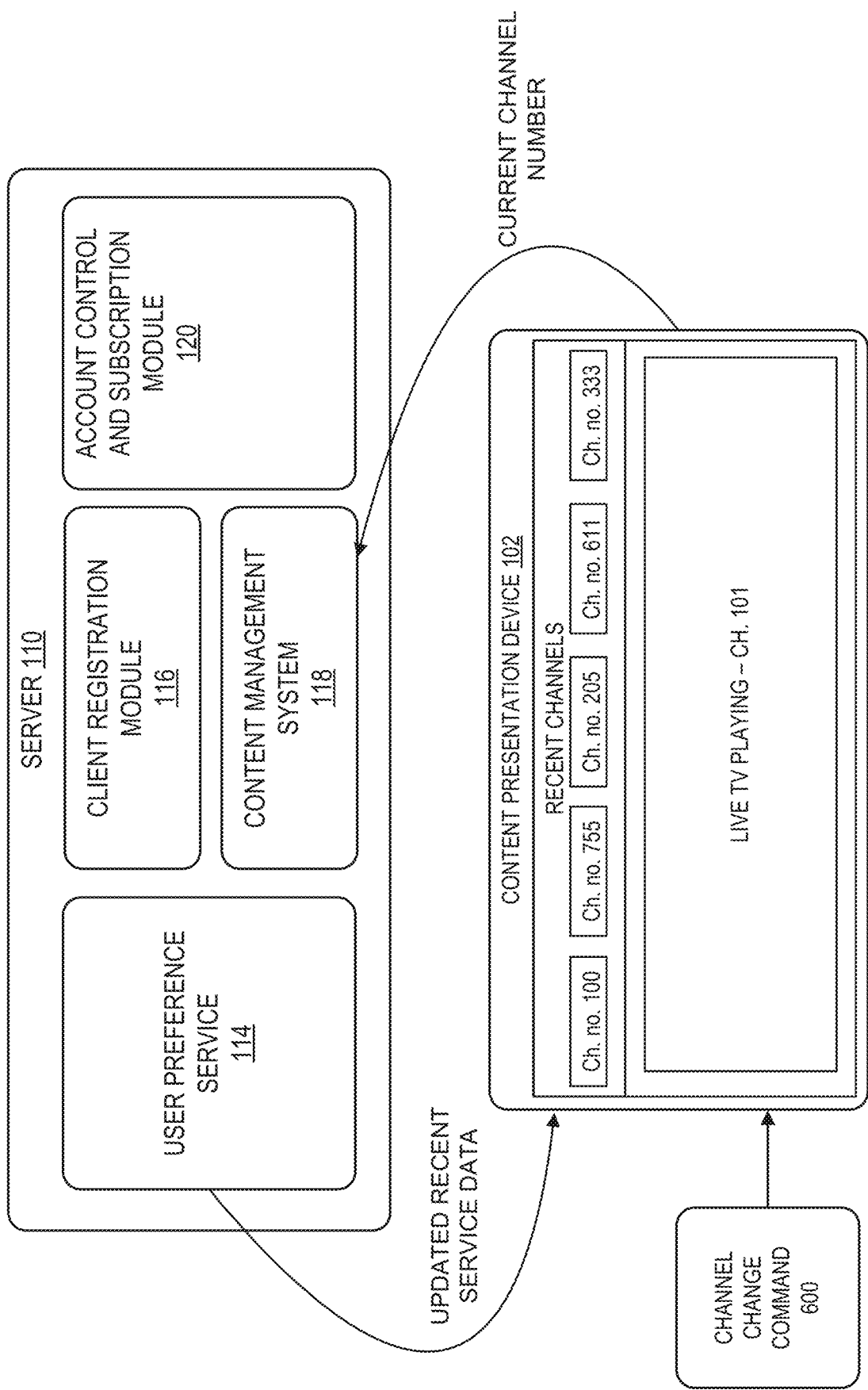
FIG. 6 is a data flow diagram illustrating a flow of data involved in displaying an updated recent channel interface associated with a particular user profile, according to some example embodiments.

FIG. 6 is a data flow diagram illustrating a flow of data involved in displaying an updated recent channel interface associated with a particular user profile, according to some example embodiments. The flow of data illustrated in FIG. 6 occurs once a user profile has been loaded, but may occur at any point during a viewing session. As shown, the flow of data begins with the content presentation device 102 receiving a channel change command 600 from the controller 122. The channel change command 600 causes the content presentation device 102 to be tuned to a new channel which, in this example, causes the content presentation device 102 to be tuned to channel 101. Once the content presentation device 102 determines the new channel has been tuned into for a predetermined amount of time (e.g., 5 minutes), the content presentation device 102 transmits an identifier of the channel (e.g., the channel number) to the server 110 for inclusion in the recent service data. Upon receiving the identifier of the new channel from the content presentation device 102, the server 110 updates the recent service data by adding the identifier of the channel, and then transmits the updated recent service data back to the content presentation device 102. The content presentation device 102 may display an updated list of recently watched channels (e.g., updated to add, delete, replace, or modify a channel identifier) in the recent channel interface in response to applicable user input (e.g., user selection of the recent channel interface).

Figure 7:
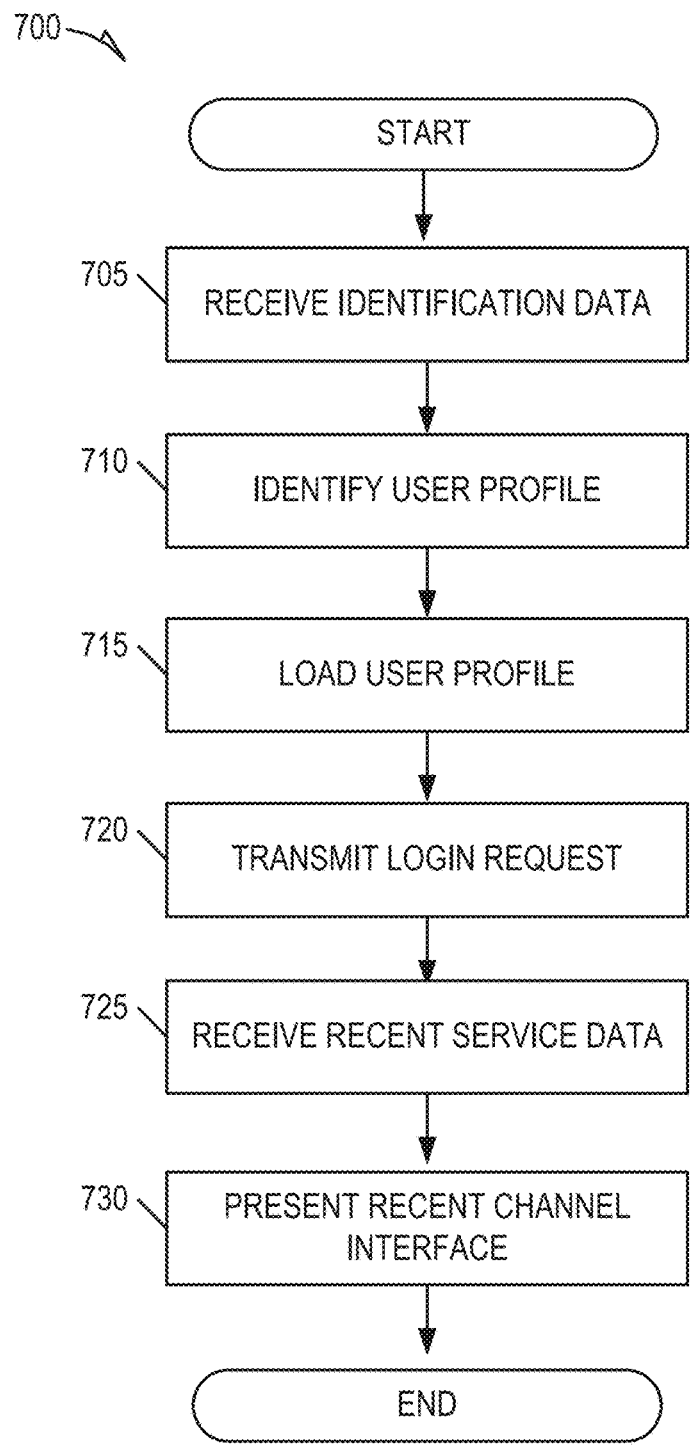
FIG. 7 is a flow chart diagram illustrating a method for presenting a recent channel interface, according to some example embodiments.

FIG. 7 is a flow chart diagram illustrating a method 700 for presenting a recent channel interface, according to some example embodiments. The method 700 may be embodied in machine-readable instructions for execution by a hardware component (e.g., a processor) such that the operations of the method 700 may be performed by the content presentation device 102. In particular, the operations of the method 700 may be performed in part or in whole by the functional components of the content presentation device 102; accordingly, the method 700 is described below, by way of example with reference thereto. However, it shall be appreciated that the method 700 may be deployed on various other hardware configurations and is not intended to be limited to the content presentation device 102. For example, in other embodiments, the method 700 may be executed by the companion presentation device 104.

At operation 705, the identification module 206 receives identification data. The identification data includes biometric data such as an image data including an image of the user or fingerprint data including a fingerprint of the user. Depending on the form of the identification data, the identification module 206 may receive the identification data from an input device such as an image capture device (e.g., a camera), a microphone, retinal scanner, or fingerprint reader communicatively coupled to or included in the content presentation device 102.

At operation 710, the identification module 206 identifies a user profile based on received identification data. The user profile may be identified from a plurality of user profiles registered with the content presentation device 102. The identifying of the user profile includes comparing the received identification data to stored authentication data.

Further details of the operation 710 are discussed below in reference to FIG. 8. At operation 715, the identification module 206 loads the identified user profile.

At operation 720, the communication module 204 transmits a login request for the user profile to the server 110. The login request is to login with the user profile at the server 110 to initiate a viewing session with the user profile on the content presentation device 102. The login request includes an identifier of the user profile along with an identification of the successful authentication of the user profile.

At operation 725, the communication module 204 receives, from the server 110, recent service data associated with the user profile. The recent server data includes identifiers of a set of recently watched channels for the user profile. The recently watched channels include channels accessed during a previous viewing session of the user profile for a threshold period of time. Further details regarding the inclusion of a channel in the set of recently watched channels are discussed below in reference to FIG. 9, according to some example embodiments.

At operation 730, the interface module 202 presents a recent channels interface on the content presentation device 102. The recent channels interface includes graphical display elements for each of the recently watched channels, each of which may selected (e.g., via appropriate user input entered using the controller 122) to tune the content presentation device 102 to the corresponding channel.

Figure 8:
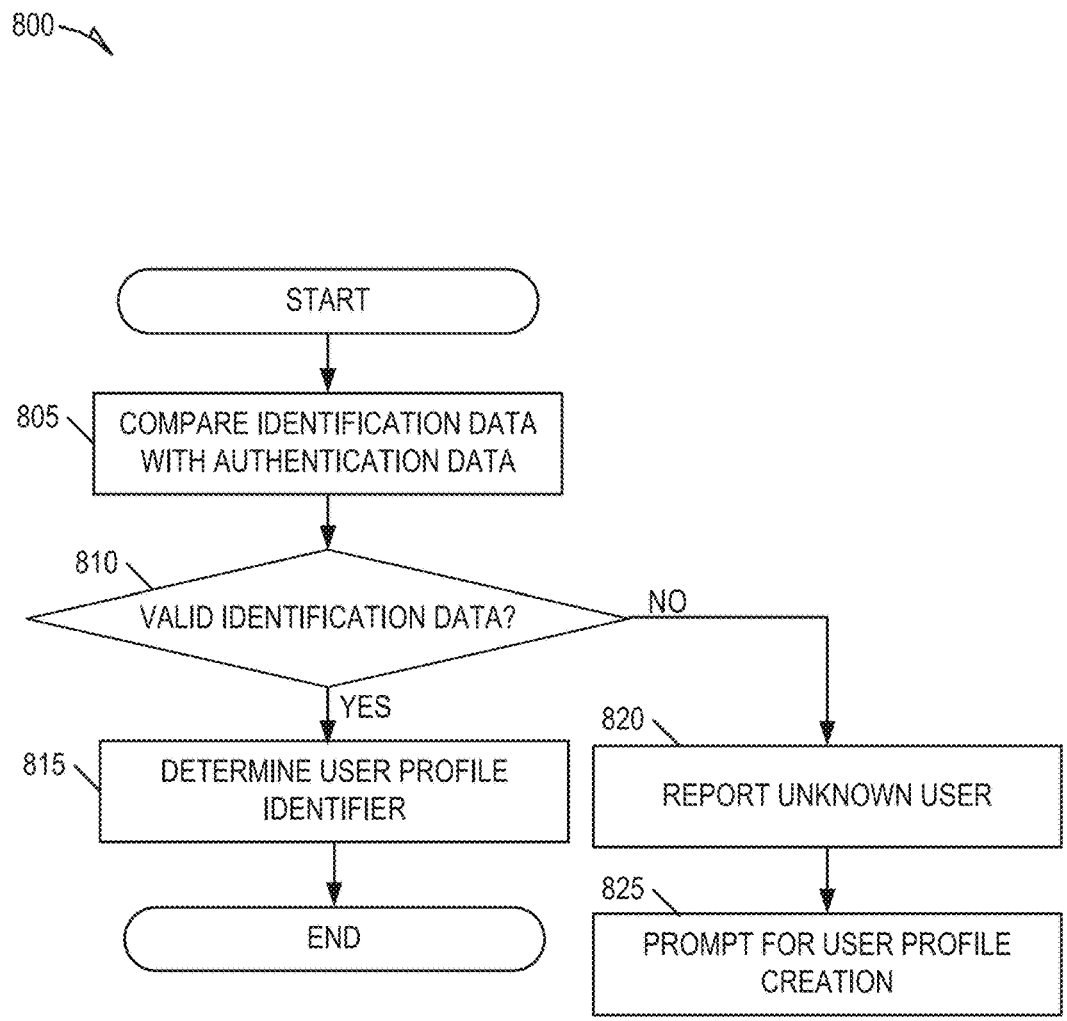
FIG. 8 is a flow chart diagram illustrating a method for identifying a user profile, according to some example embodiments.

FIG. 8 is a flow chart diagram illustrating a method 800 for identifying a user profile, according to some example embodiments. The method 800 may be embodied in machine-readable instructions for execution by a hardware component (e.g., a processor) such that the operations of the method 800 may be performed by the content presentation device 102. In particular, the operations of the method 800 may be performed in part or in whole by the functional components of the content presentation device 102; accordingly, the method 800 is described below, by way of example with reference thereto. However, it shall be appreciated that the method 800 may be deployed on various other hardware configurations and is not intended to be limited to the content presentation device 102. For example, in other embodiments, the method 800 may be executed by the server 110 or the companion presentation device 104.

At operation 805, the identification module 206 compares the received identification data to authentication data stored in one or more user profile records stored in the user database 210 to identify a matching user profile record. As an example, the identification module 206 may compare a received image of a user to stored images of a plurality of users with registered user profiles on the content presentation device 102 (e.g., users having a corresponding user profile record). In some embodiments, the comparing of the images may include performing facial recognition techniques on the received and stored images to identify a matching user profile record. In some embodiments, the comparing of the images may include performing iris recognition techniques on the received and stored images to identify a matching user profile record.

As another example, the identification module 206 may compare received fingerprint data (e.g., received from a fingerprint reader communicatively coupled to or embedded in the content presentation device 102) with stored fingerprint data of a plurality of users with registered user profiles on the content presentation device 102 (e.g., users having a corresponding user profile record). In comparing the received fingerprint data to the stored fingerprint data, the identification module 206 employs known fingerprint identification and matching techniques to identify a matching user profile record.

At operation 810, the identification module 206 determines if the identification data is valid based on whether a matching user profile record is identified during operation 805. If the identification module 206 identifies a matching user profile record then the identification data is determined to be valid, and the method 800 proceeds to operation 815 where the identification module 206 determines an identifier of the user profile associated with the matching user profile record.

If the identification module 206 does not identify a matching user profile record then the identification data is determined to be invalid, and the method 800 proceeds to operation 820 wherein the communication module 204 reports an unknown user to the server 110. At operation 825, the interface module 202 displays a prompt on the content presentation device 102 for the unknown user to create a user profile. In some embodiments, the method 300 may commence subsequent to the operation 825.

Figure 9:
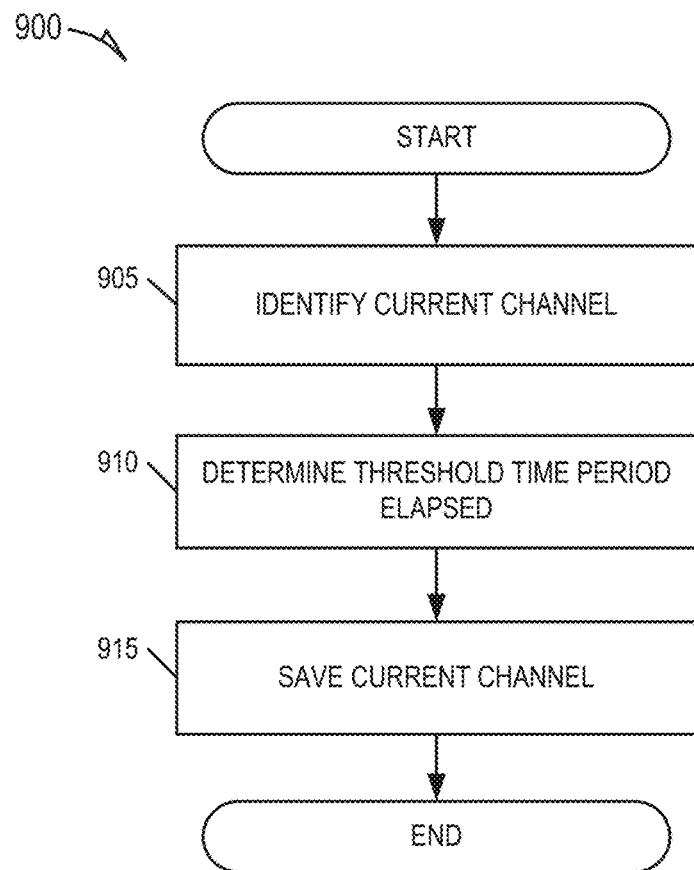
FIG. 9 is a flow chart diagram illustrating a method for updating recent service data, according to some example embodiments.

FIG. 9 is a flow chart diagram illustrating a method for updating recent service data, according to some example embodiments. The method 900 may be embodied in machine-readable instructions for execution by a hardware component (e.g., a processor) such that the operations of the method 900 may be performed by the content presentation device 102. In particular, the operations of the method 900 may be performed in part or in whole by the functional components of the content presentation device 102; accordingly, the method 900 is described below, by way of example with reference thereto. However, it shall be appreciated that the method 700 may be deployed on various other hardware configurations and is not intended to be limited to the content presentation device 102.

At operation 905, the detection module 208 identifies a current channel being accessed by the content presentation device 102 (e.g., the channel to which the content presentation device 102 is tuned) during a content viewing session associated with a currently logged-in user profile. The identifying of the current channel includes determining an identifier of the current channel (e.g., a channel number).

At operation 910, the detection module 208 determines that the content presentation device 102 has continued to access (e.g., has remained tuned to) the current channel for a threshold time period (e.g., 5 minutes). The threshold time period may be a pre-established value, or may be set based on user preferences.

In response to determining the content presentation device 102 has remained tuned to the current channel for the threshold time period, the detection module 208, at operation 915, saves the current channel as a recently watched channel. More specifically, in saving the current channel, the detection module 208 causes the recent service data to be updated with an identifier of the current channel. To add the channel, the detection module 208 works in conjunction with the communication module 204 to transmit an identifier of the current channel to the server 110 where the identifier is used to update recent service data stored in the database 112.

Figure 10:
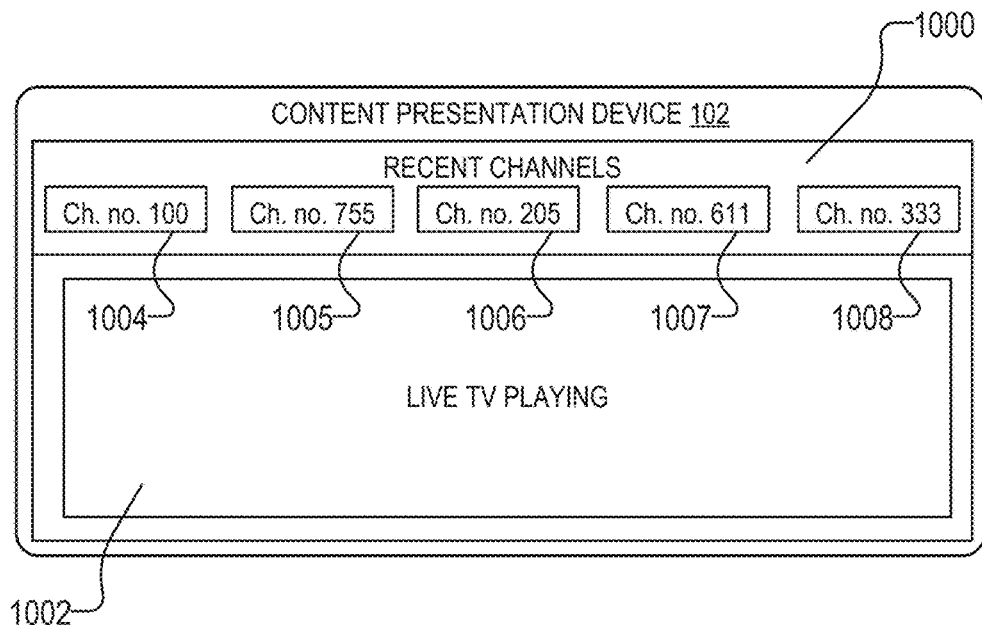
FIG. 10 is an interface diagram illustrating a recent channel interface associated with a first user, according to some example embodiments.

FIG. 10 is an interface diagram illustrating a recent channel interface 1000 associated with a first user profile, according to some example embodiments. As shown, the recent channel interface 1000 is presented on the content presentation device 102. The recent channel interface 1000 is presented on the content presentation device 102 in conjunction with live programming 1002. More specifically, as illustrated, the recent channel interface 1000 includes a banner displayed above the live programming 1002. The recent channel interface 1000 may be displayed (e.g., in response to user selection) once the content presentation device 102 identifies and authenticates the first user profile using, for example, biometric data.

The recent channel interface 1000 includes selectable elements 1004-1008, each of which includes an identifier (e.g., a channel number, service name, or service identifier) of a recently watched channel (e.g., a channel watched during a previous viewing session for a threshold period of time) associated with the first user profile. A user may select (e.g., through appropriate input entered using the controller 122) any one of the selectable elements 1004-1008 to cause the content presentation device 102 to be tuned to the channel corresponding to the selectable element. In some embodiments, the selectable elements 1004-1008 may include a thumbnail image associated with the channel such as a logo or content related to the programming provided by the channel.

Figure 11:
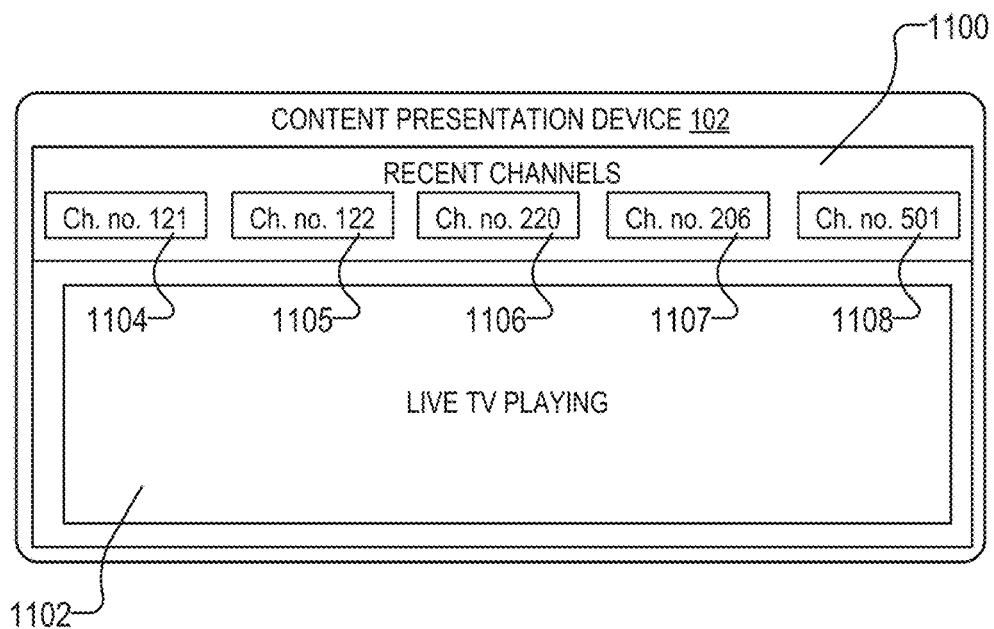
FIG. 11 is an interface diagram illustrating a recent channel interface associated with a second user, according to some example embodiments.

FIG. 11 is an interface diagram illustrating a recent channel interface 1100 associated with a second user, according to some example embodiments. As shown, the recent channel interface 1100 is displayed in a similar fashion to the recent channel interface 1000—the recent channel interface 1100 is displayed on the content presentation device 102 in conjunction with live programming 1102. Likewise, the recent channel interface 1100 includes similar elements to that of recent channel interface 1000—the recent channel interface 1100 includes selectable elements 1104-1108 that correspond to recently watched channels and may be used to tune the content presentation device 102 to respective recently watched channels. However, the particular channels that correspond to the selectable elements 1104-1108 are instead associated with a second user profile, and are, therefore, a different set of channels than those included in the recent watched channel interface 1000. Accordingly, the recent channel interface 1100 may be displayed (e.g., in response to user selection) once the content presentation device 102 identifies and authenticates the second user profile using, for example, biometric data. The second user profile may be identified and authenticated as long as no other user profiles are already logged in (e.g., the first user profile has been logged off).

Figure 12:
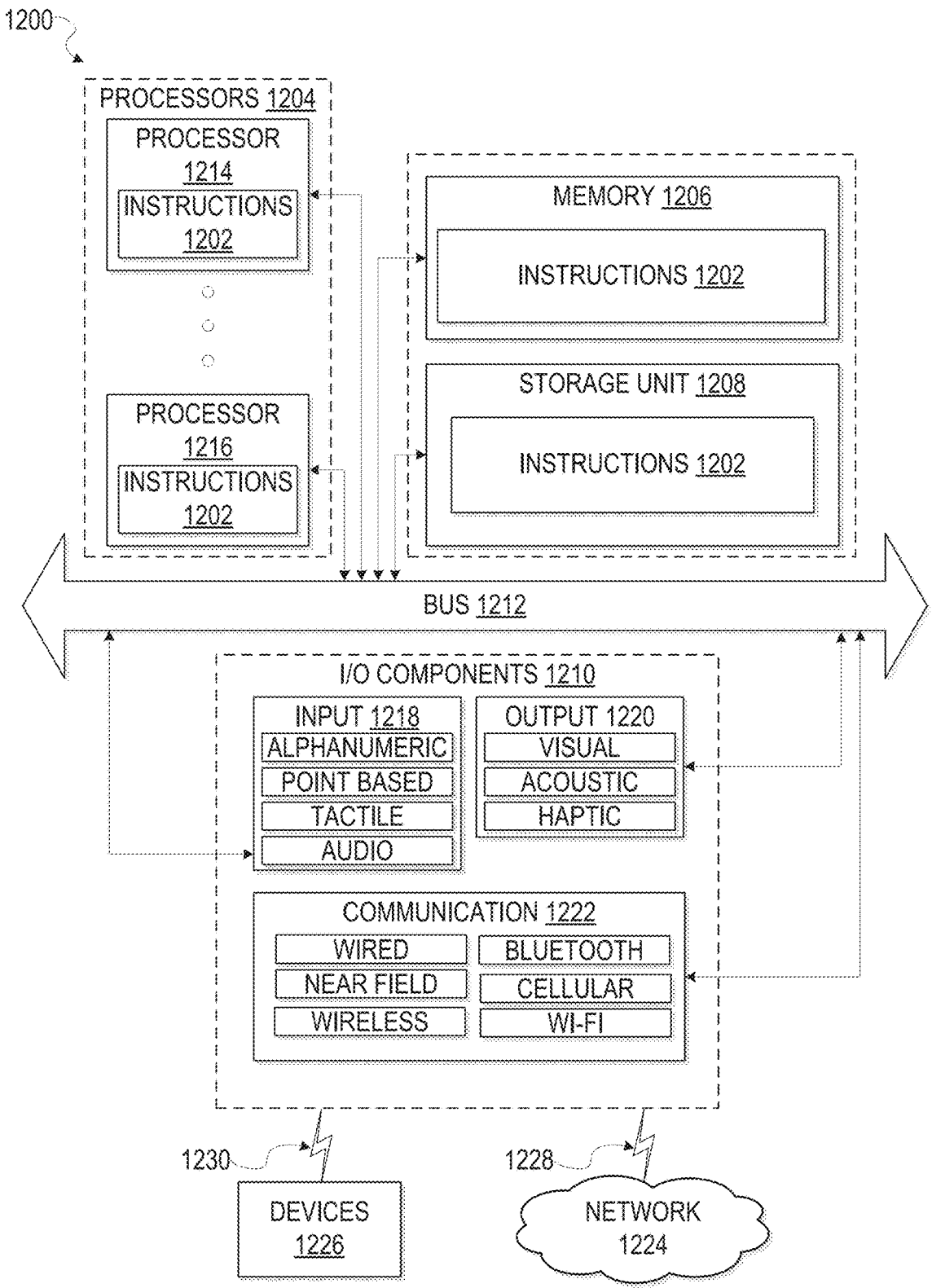
FIG. 12 is a diagrammatic representation of a machine in the example form of a computer system within which a set of instructions for causing the machine to perform any one or more of the methodologies discussed herein may be executed.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a system, within which instructions 1202 (e.g., software, a program, an application, an applet, an app, a driver, or other executable code) for causing the machine 1200 to perform any one or more of the methodologies discussed herein may be executed. For example, the instructions 1202 include executable code that causes the machine 1200 to execute the methods 300, 700, 800, and 900. In this way, these instructions transform the general, non-programmed machine into a particular machine programmed to carry out the described and illustrated functions of the content presentation device 102 in the manner described herein. The machine 1200 may operate as a standalone device or may be coupled (e.g., networked) to other machines.

By way of non-limiting example, the machine 1200 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 1202, sequentially or otherwise, that specify actions to be taken by machine 1200. Further, while only a single machine 1200 is illustrated, the term "machine" shall also be taken to include a collection of machines 1200 that individually or jointly execute the instructions 1202 to perform any one or more of the methodologies discussed herein.

The machine 1200 may include processors 1204, memory 1206, storage unit 1208 and I/O components 1210, which may be configured to communicate with each other such as via a bus 1212. In an example embodiment, the processors 1204 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1214 and processor 1216 that may execute instructions 1202. The term "processor" is intended to include multi-core processors that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core process), multiple processors with a single core, multiple processors with multiples cores, or any combination thereof The memory 1206 (e.g., a main memory or other memory storage) and the storage unit 1208 are both accessible to the processors 1204 such as via the bus 1212. The memory 1206 and the storage unit 1208 store the instructions 1202 embodying any one or more of the methodologies or functions described herein. In some embodiments, the user database 210 resides on the storage unit 1208. The instructions 1202 may also reside, completely or partially, within the memory 1206, within the storage unit 1208, within at least one of the processors 1204 (e.g., within the processor's cache memory), or any suitable combination thereof, during execution thereof by the machine 1200. Accordingly, the memory 1206, the storage unit 1208, and the memory of processors 1204 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1202. The term "machine-readable medium" shall also be taken to include any medium, or combination of multiple media, that is capable of storing instructions (e.g., instructions 1202) for execution by a machine (e.g., machine 1200), such that the instructions, when executed by one or more processors of the machine 1200 (e.g., processors 1204), cause the machine 1200 to perform any one or more of the methodologies described herein (e.g., method 300, 700, 800 and 900). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1210 may include a wide variety of components to receive input, provide output, produce output, transmit information, exchange information, capture measurements, and so on. The specific I/O components 1200 that are included in a particular machine will depend on the type of machine. For example, portable machines such as mobile phones will likely include a touch input device or other such input mechanisms, while a headless server machine will likely not include such a touch input device. It will be appreciated that the I/O components 1210 may include many other components that are not specifically shown in FIG. 12. The I/O components 1210 are grouped according to functionality merely for simplifying the following discussion and the grouping is in no way limiting. In various example embodiments, the I/O components 1210 may include input components 1218 and output components 1220. The input components 1218 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 1220 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1210 may include communication components 1222 operable to couple the machine 1200 to a network 1224 or devices 1226 via coupling 1228 and coupling 1230 respectively. For example, the communication components 1222 may include a network interface component or other suitable device to interface with the network 1224. In further examples, communication components 1222 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1226 may be another machine or any of a wide variety of peripheral devices (e.g., a peripheral device coupled via a Universal Serial Bus (USB) or the content presentation device controller 122).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
providing, to a first device, service data that corresponds to a user profile registered with both the first device and a second device, the service data including a first identifier of a first content source accessed via the user profile registered with the first and second devices;
receiving, from the second device with which the user profile is registered, a second identifier of a second content source accessed by the second device for at least a threshold time;
updating, by one or more processors, the service data to include the second identifier of the second content source based on the second content source being accessed for at least the threshold time by the second device with which the user profile is registered; and
sending, to the first device with which the user profile is registered, the updated service data including the first identifier of the first content source and the second identifier of the second content source accessed for at least the threshold time by the second device with which the user profile is registered.

2. The method of claim 1, wherein:
based on the updated service data sent to the first device, the first device updates an interactive interface that includes selectable elements corresponding to the first and second content sources accessed via the user profile.

3. The method of claim 1, further comprising:
receiving, by the second device with which the user profile is registered, a channel change command; and
determining, in response to the received channel change command, that the second device accessed the second content source for at least the threshold time.

4. The method of claim 1, wherein:
the user profile is among a plurality of user profiles registered with the first device and registered with the second device.

5. The method of claim 1, wherein:
the user profile is a first user profile;
the service data is first service data; and the method further comprises:
sending, to the first device, second service data that corresponds to a second user profile registered with the first device, the second service data including a third identifier of a third content source accessed via the second user profile registered with the first device.

6. The method of claim 5, further comprising:
detecting a request to login with the second user profile at the first device; and wherein:
the sending, to the first device, of the second service data that corresponds to the second user profile is responsive to the detected request to login with the second user profile at the first device.

7. The method of claim 1, wherein:
the updated service data includes a third identifier of a third content source accessed by the second device with which the user profile is registered.

8. The method of claim 1, further comprising:
detecting a request to login with the user profile at the first device; and wherein:
the sending, to the first device, of the updated service data that corresponds to the user profile is responsive to the detected request to login with the user profile at the first device.

9. The method of claim 1, further comprising:
receiving identification data from the first device;
comparing the identification data with authentication data that corresponds to a plurality of user profiles that include the user profile; and
identifying the user profile among the plurality of user profiles based on the identification data matching authentication data that corresponds to the user profile.

10. The method of claim 1, further comprising:
receiving identification data from the first device;
comparing the identification data with authentication data that corresponds to a plurality of user profiles that include the user profile;
determining that the identification data is invalid based on the comparing; and
causing the first device to present a prompt to create a new user profile.

11. A system comprising:
one or more processors; and
a memory storing instructions that, when executed by at least one processor among the one or more processors, cause the system to perform operations comprising:
providing, to a first device, service data that corresponds to a user profile registered with both the first device and a second device, the service data including a first identifier of a first content source accessed via the user profile registered with the first and second devices;
receiving, from the second device with which the user profile is registered, a second identifier of a second content source accessed by the second device for at least a threshold time;
updating, by one or more processors, the service data to include the second identifier of the second content source based on the second content source being accessed for at least the threshold time by the second device with which the user profile is registered; and
sending, to the first device with which the user profile is registered, the updated service data including the first identifier of the first content source and the second identifier of the second content source accessed for at least the threshold time by the second device with which the user profile is registered.

12. The system of claim 11, wherein:
based on the updated service data sent to the first device, the first device updates an interactive interface that includes selectable elements corresponding to the first and second content sources accessed via the user profile.

13. The system of claim 11, wherein the operations further comprise:
receiving, by the second device with which the user profile is registered, a channel change command; and
determining, in response to the received channel change command, that the second device accessed the second content source for at least the threshold time.

14. The system of claim 11, wherein:
the user profile is a first user profile;
the service data is first service data; and the operations further comprise:
sending, to the first device, second service data that corresponds to a second user profile registered with the first device, the second service data including a third identifier of a third content source accessed via the second user profile registered with the first device.

15. The system of claim 14, wherein the operations further comprise:
    detecting a request to login with the second user profile at the first device; and wherein:
    the sending, to the first device, of the second service data that corresponds to the second user profile is responsive to the detected request to login with the second user profile at the first device.

16. The system of claim 11, wherein:
    the updated service data includes a third identifier of a third content source accessed by the second device with which the user profile is registered.

17. The system of claim 11, wherein the operations further comprise:
    detecting a request to login with the user profile at the first device; and wherein:
    the sending, to the first device, of the updated service data that corresponds to the user profile is responsive to the detected request to login with the user profile at the first device.

18. A non-transitory machine-readable storage medium comprising instructions that, when executed by at least one processor of a machine, cause the machine to perform operations comprising:
    providing, to a first device, service data that corresponds to a user profile registered with both the first device and a second device, the service data including a first identifier of a first content source accessed via the user profile registered with the first and second devices;
    receiving, from the second device with which the user profile is registered, a second identifier of a second content source accessed by the second device for at least a threshold time;
    updating, by one or more processors, the service data to include the second identifier of the second content source based on the second content source being accessed for at least the threshold time by the second device with which the user profile is registered; and
    sending, to the first device with which the user profile is registered, the updated service data including the first identifier of the first content source and the second identifier of the second content source accessed for at least the threshold time by the second device with which the user profile is registered.

19. The non-transitory machine-readable storage medium of claim 18, wherein:
    based on the updated service data sent to the first device, the first device updates an interactive interface that includes selectable elements corresponding to the first and second content sources accessed via the user profile.

20. The non-transitory machine-readable storage medium of claim 18, wherein the operations further comprise:
    receiving, by the second device with which the user profile is registered, a channel change command; and
    determining, in response to the received channel change command, that the second device accessed the second content source for at least the threshold time.

\* \* \* \* \*